US005918558A

United States Patent [19]

Susag

[11] Patent Number: 5,918,558

[45] Date of Patent: Jul. 6, 1999

[54] DUAL-PUMP, FLOW-ISOLATED HYDRAULIC CIRCUIT FOR AN AGRICULTURAL TRACTOR

[75] Inventor: David E. Susag, Fargo, N. Dak.

[73] Assignee: Case Corporation, Racine, Wis.

[21] Appl. No.: 08/980,827

[22] Filed: Dec. 1, 1997

[51] Int. Cl.[6] .......... F16D 31/02; F15B 11/00

[52] U.S. Cl. .......... 111/200; 60/413; 60/422

[58] Field of Search .......... 111/200; 60/422, 60/413

[56] References Cited

U.S. PATENT DOCUMENTS

| | | | |
|---|---|---|---|
| 3,279,558 | 10/1966 | Allen et al. | 60/422 X |
| 3,304,709 | 2/1967 | Mercier et al. | 60/422 X |
| 3,994,133 | 11/1976 | Pfeil et al. | 60/422 |
| 4,422,290 | 12/1983 | Huffman | 60/422 X |
| 4,449,365 | 5/1984 | Hancock | 60/422 |
| 4,553,389 | 11/1985 | Tischer et al. | 60/422 X |
| 4,819,430 | 4/1989 | Becker | 60/422 X |
| 4,835,968 | 6/1989 | Yamaguchi | 60/422 |
| 5,050,379 | 9/1991 | Nagai et al. | 60/422 X |
| 5,131,227 | 7/1992 | Iseman | 60/422 |
| 5,148,676 | 9/1992 | Moriya et al. | 60/422 X |
| 5,160,814 | 11/1992 | Petermann | 181/106 |
| 5,285,641 | 2/1994 | Goto et al. | 60/422 |
| 5,313,795 | 5/1994 | Dunn | 60/413 |
| 5,471,908 | 12/1995 | Lech | 60/424 X |
| 5,562,019 | 10/1996 | Kropp | 60/422 X |
| 5,615,553 | 4/1997 | Lourigan | 60/422 |

*Primary Examiner*—Christopher J. Novosad
*Attorney, Agent, or Firm*—Jansson, Shupe, Bridge & Munger, Ltd.

[57] ABSTRACT

A hydraulic circuit has first and second pumps coupled to first and second directional valves, each controlling work mechanisms such as a hydraulic cylinder and a hydraulic motor. The directional valves are in a valve assembly having a fluid passage through it. The passage includes first and second input ports and a passage closure intermediate the ports to prevent cross-feeding of the pumps. The first valve is connected to the passage between the first port and the closure and the first pump flows fluid to the first port. Similarly, the second valve is connected to the passage between the second port and the closure and the second pump flows fluid to the second port. In a more-specific embodiment, the second pump is a variable displacement pump and the first pump is a fixed displacement pump also connected to a power steering system through a priority valve. Thus, the first pump flows fluid to the power steering system as well as to the first port.

8 Claims, 7 Drawing Sheets

DUAL-PUMP, FLOW-ISOLATED HYDRAULIC CIRCUIT FOR AN AGRICULTURAL TRACTOR

FIELD OF THE INVENTION

This invention relates generally to power plants and, more particularly, to power plants of the type having pressure pumps and fluid motors and commonly known as hydraulic power systems.

BACKGROUND OF THE INVENTION

Hydraulic circuits are widely used on mobile machines such as mowers, construction equipment, agricultural tractors and the like for powering one or more "work functions." Hydraulic systems are ideal for this operating environment at least since, unlike mechanical drive systems, they are not restricted to straight mechanical drive lines. That is, hydraulic motors, cylinders can be mounted in out-of-the-way places and fed by fluid pumped through flexible hose-like hydraulic lines.

Another advantage of a hydraulic circuit is that output power may be readily controlled. There is a wide choice of control valve configurations and new ones are continually being developed.

It is not unusual for a hydraulic circuit to be required to power several different functions, sometimes simultaneously. And different functions have differing characteristics that must be recognized as the circuit is being configured. For example, where the machine is equipped with power steering, the circuit must be arranged so that as to two or more circuits powered from a particular pump, the power steering circuit has priority.

Other functions such as the hydraulic cylinder used to raise and lower the 3-point hitch on a tractor or the hydraulic cylinders used to fold and unfold the extension wings of a planter are used only occasionally in what might be described as "setup" operations. Still other functions, while not critical to operator safety or vehicular control like power steering, are nevertheless required to operate more-or-less continuously. The hydraulic motor powering a crop sprayer pump is an example.

As examples of known hydraulic circuits, U.S. Pat. No. 5,313,795 (Dunn) depicts a hydraulic circuit having two fixed-displacement pumps. The first powers the steering system on a priority basis and also powers the brake and/or implement hydraulic system. The second pump powers a brake on a priority basis and also powers the implement hydraulic system.

U.S. Pat. No. 5,615,553 (Lourigan) discloses a two-pump circuit in which the first pump powers, on a priority basis, a torque-converter transmission, brakes and the like. Such pump also powers auxiliary valves if the priority needs have been met. The second pump powers auxiliary valves and pump output flows are joined under certain operating circumstances.

As evidenced by the Dunn and Lourigan patents, it is not unusual to include two hydraulic pumps in a circuit. Of course, the number of pumps is a function of their flow outputs and circuit flow demands. Sometimes the flows of two pumps are combined. And since a hydraulic circuit is a dynamic system involving trapped liquid under pressure and involving columns of liquid which move and stop upon demand (much like water in a household water system), pressures (including pressure "spikes") and flows can interact with one another and produce some undesirable results.

The new hydraulic circuit described below is specially configured to isolate intermittently- and continuously-operated functions from one another. The circuit also isolates the rather-sensitive control mechanism of a variable displacement pump from the vagaries of pressure spikes and the like which may occur elsewhere in the circuit.

OBJECTS OF THE INVENTION

It is an object of the invention to provide a new hydraulic circuit for mobile equipment which overcomes problems and shortcomings of known types of hydraulic circuits.

Another object of the invention is to provide a new hydraulic circuit well suited for use on implement-towing agricultural tractors.

Another object of the invention is to provide a new hydraulic circuit well suited for powering multiple functions on such implements.

Another object of the invention is to provide a new hydraulic circuit which substantially isolates intermittently- and continuously-operated functions from one another.

Yet another object of the invention is to provide a new hydraulic circuit which protects variable displacement pump control mechanisms from pressure- and flow-related events which may occur elsewhere in the circuit. How these and other objects are accomplished will become apparent from the following descriptions and from the drawings.

SUMMARY OF THE INVENTION

The invention is an improvement in a hydraulic circuit of the type having first and second pumps coupled to a plurality of directional valves controlling work mechanisms such as one or more hydraulic cylinders and one or more rotary motors. The new circuit is well suited for mobile vehicles and, most particularly, for agricultural tractors.

In the improvement, the directional valves are preferably in a modular or manifolded valve assembly having a fluid passage through it. The passage includes a first input port to which the first pump flows fluid and a second input port to which the second pump flows fluid. A passage closure, e.g., a plug or the like, is intermediate the ports, prevents cross-feeding of the pumps and segments the passage into first and second feed paths.

In more specific aspects of the invention, the directional valves include a first valve connected to the passage between the first port and the closure and "fed" by the first pump. Similarly, a second valve is connected to the passage between the second port and the closure and is fed by the second pump.

In a highly preferred embodiment, the first pump is a fixed displacement pump and in addition to being connected to the first valve, is also connected to a power steering system through a priority valve. The first pump thereby does "double duty" in that it flows fluid to the power steering system and to the first port and first valve. Since there are times when the vehicle power steering system is demanding most or all of the flow from the first pump, it is preferred that the first valve be connected to a work mechanism, e.g., the above-noted hydraulic cylinder (a form of reciprocating actuator), which is required to operate only intermittently.

And, preferably, the second pump is a variable displacement pump of the pressure-compensated, flow-compensated type. By virtue of the connection arrangement described above, the second pump maintains fluid pressure at the second port and is "dedicated" to feeding the second valve and any other valve(s) connected between the second port and the closure. Since fluid from the second pump is always available to the second valve, such valve may be coupled to a second work mechanism of the type having a rotary hydraulic motor, a form of rotary actuator, that runs continuously for extended periods of time.

In other aspects of the invention, the manifolded valve assembly includes a manifold block with first and second valves fitted in it. The block also has, in addition to the flow-isolated feed paths mentioned above, a first return path connected to the first valve and a second return path flow-isolated from the first return path and connected to the second valve. After fluid passes through the first valve and the exemplary hydraulic cylinder and through the second valve and the exemplary hydraulic motor, such fluid flows back to a tank or reservoir through the first and second return paths, respectively.

The second pump has an inlet through which fluid is drawn into the pump to be delivered under pressure to the second valve and to the motor connected thereto. In yet another aspect of the hydraulic circuit, the first and second return paths are connected to the pump inlet through a common return line.

As but one example of how the new hydraulic circuit is used, such circuit is built into and forms a part of an agricultural tractor which tows, e.g., a planter. The planter extends laterally to the left and right of the tractor and, in a larger planter, has left and right outboard extensions or "wings" which fold inwardly to reduce the width of the planter when transporting it along a highway.

The exemplary planter has a planting mechanism powered by a rotary hydraulic motor which, during actual seed planting, runs continuously. The planter wings are powered by respective hydraulic cylinders for folding and unfolding such wings. Most preferably, the first valve (that valve fed by the first pump) is connected to a wing-folding hydraulic cylinder and the second valve is connected to the motor. Other details of the invention are set forth in the following detailed description and in the drawings.

DETAILED DESCRIPTION OF PREFERRED EMBODIMENTS

Figure 1:
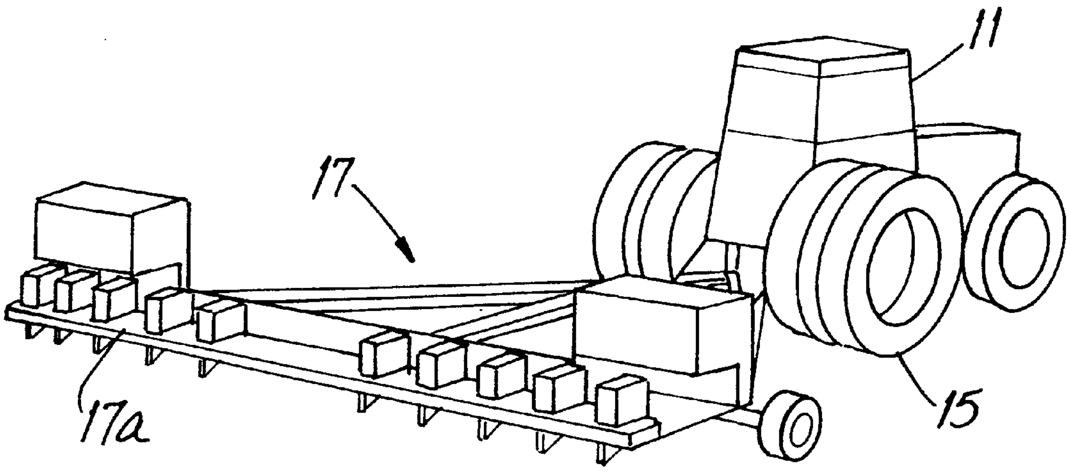
FIG. 1 is a simplified representation of an agricultural tractor towing a planter.
Figure 2:
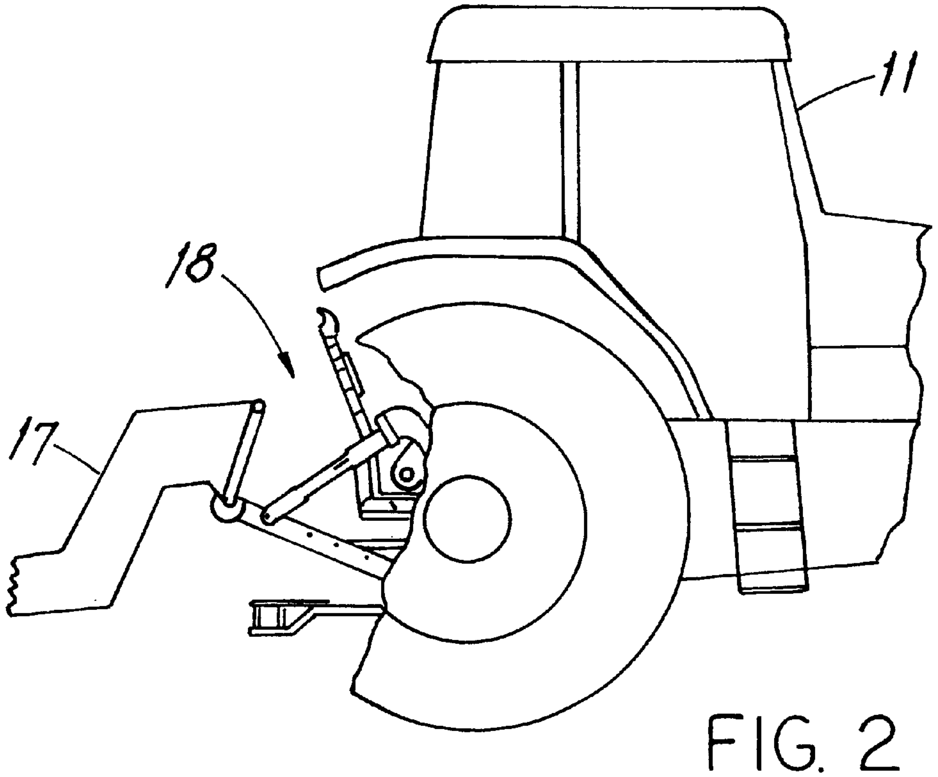
FIG. 2 is a side elevation view of the tractor of FIG. 1 including a 3-point hitch used to tow the planter. Parts are broken away.
Figure 3:
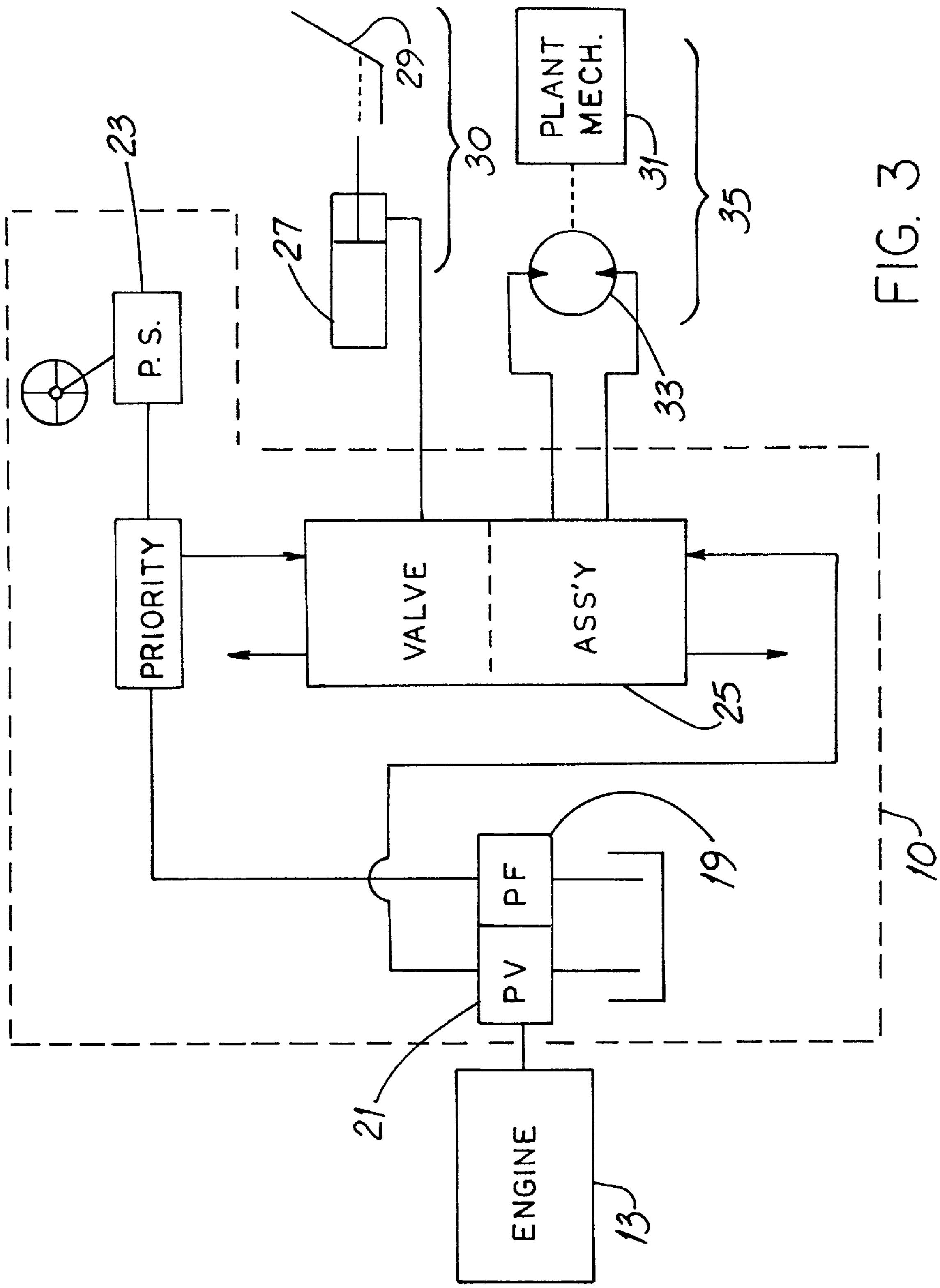
FIG. 3 is a simplified diagram of the new hydraulic circuit.

Before describing the new hydraulic circuit 10, it will be helpful to have an understanding of an exemplary way in which the circuit 10 can be used. Referring to FIGS. 1, 2 and 3, an agricultural tractor 11 has an engine 13 which provides, through a geared transmission and the tractor rear wheels 15, motive power for the tractor 11 and an implement 17 towed behind the tractor 11. The implement 17 is coupled to the tractor 11 by a 3-point hitch 18.

The engine 13 also powers a first pump 19 and a second pump 21, the former being of the fixed displacement (PF) type and the latter preferably being of the variable displacement (PV), pressure-compensated, flow-compensated type. The first pump 19 flows fluid, e.g., hydraulic oil, to a power steering system 21 on a priority basis and so long as the needs of such system are satisfied, to the modular valve assembly 25. The second pump 21 is a dedicated pump in that it flows fluid only to the modular valve assembly 25.

The towed implement 17 is an exemplary seed planter **17*a* and in use, such planter 17*a* extends laterally a significant distance to the left and to the right of the tractor 11. In fact, the overall length of the planter 17*a* when in use may be 15 to 20 feet (about 4.6 to 6.1 meters) or so. Clearly, a planter 17*a*** of such length cannot be transported by towing along the highway.

Therefore, the dimension of the planter **17*a* lateral to the direction of travel can be substantially reduced by configuring the planter 17*a* with wings 29 which fold and unfold under the urging of respective, intermittently-used hydraulic cylinders 27, one of which is shown in FIG. 3. In this specification, a wing 29 and its hydraulic cylinder 27 are referred to as the first work mechanism 30**.

The planter **17*a* also has a planting mechanism 31 powered by a rotary actuator, e.g., a hydraulic motor 33, which runs continuously for seed planting when the planter 17*a* is in operation. In this specification, the planting mechanism 31 and its motor 33 are referred to as the second work mechanism 35. The cylinders 27 and motor 33 (and other hydraulically-operated planter functions) are connected to the circuit 10** using suitable flexible hydraulic hoses.

(It is to be appreciated that the planter **17*a* is described to provide an understanding of but one way in which the circuit 10 might be used. There is seemingly no reason why the circuit 10** cannot be used on other types of mobile equipment and/or to power other types of functions.)

Referring also to FIGS. 4A–D, details of the new circuit 10 will now be described. A reservoir 37 contains the fluid, e.g., hydraulic oil, delivered by the first and second pumps 19, 21, respectively, to the valve assembly 25. The assembly 25 is preferably configured to include a manifold 39 made of a block of machined steel, cast iron or the like having first, second, third and fourth valves 41, 43, 45, 47, respectively, mounted in it. The valves 41, 45 are connected to first and second work mechanisms 30, 35 respectively. The valve 43 is connected to another motor 49 and the valve 47 is also connected to a motor 51. For reasons that will become apparent, it is preferred that motor 49 power a function which is used only intermittently. Motor 51 may power a function which is used intermittently or continuously.

An input passage 55 is formed in the manifold 39 and has first and second input port 57, 59 respectively, and a passage closure 61 (a plug or the like) between the ports 57, 59. The closure 61 divides the passage into first and second feed paths 63, 65, respectively. As further described below, the pumps 19, 21 flow fluid to the ports 57, 59, respectively, and the closure 61 prevents pump "cross feeding."

The manifold also includes a return passage 67 having first and second discharge ports 69, 71, respectively, and a passage closure 73 between the ports. The closure 73 divides the return passage 67 into first and second return paths 75, 77, respectively.

The tractor 11 also includes a power steering system 23 of a known type. For parts of the description below, it will be helpful to understand that when the steering wheel is being turned rapidly, the system 23 requires a significant flow of hydraulic fluid along the line 79. And the pressure in the line 79 may fall dramatically.

Figure 4A:
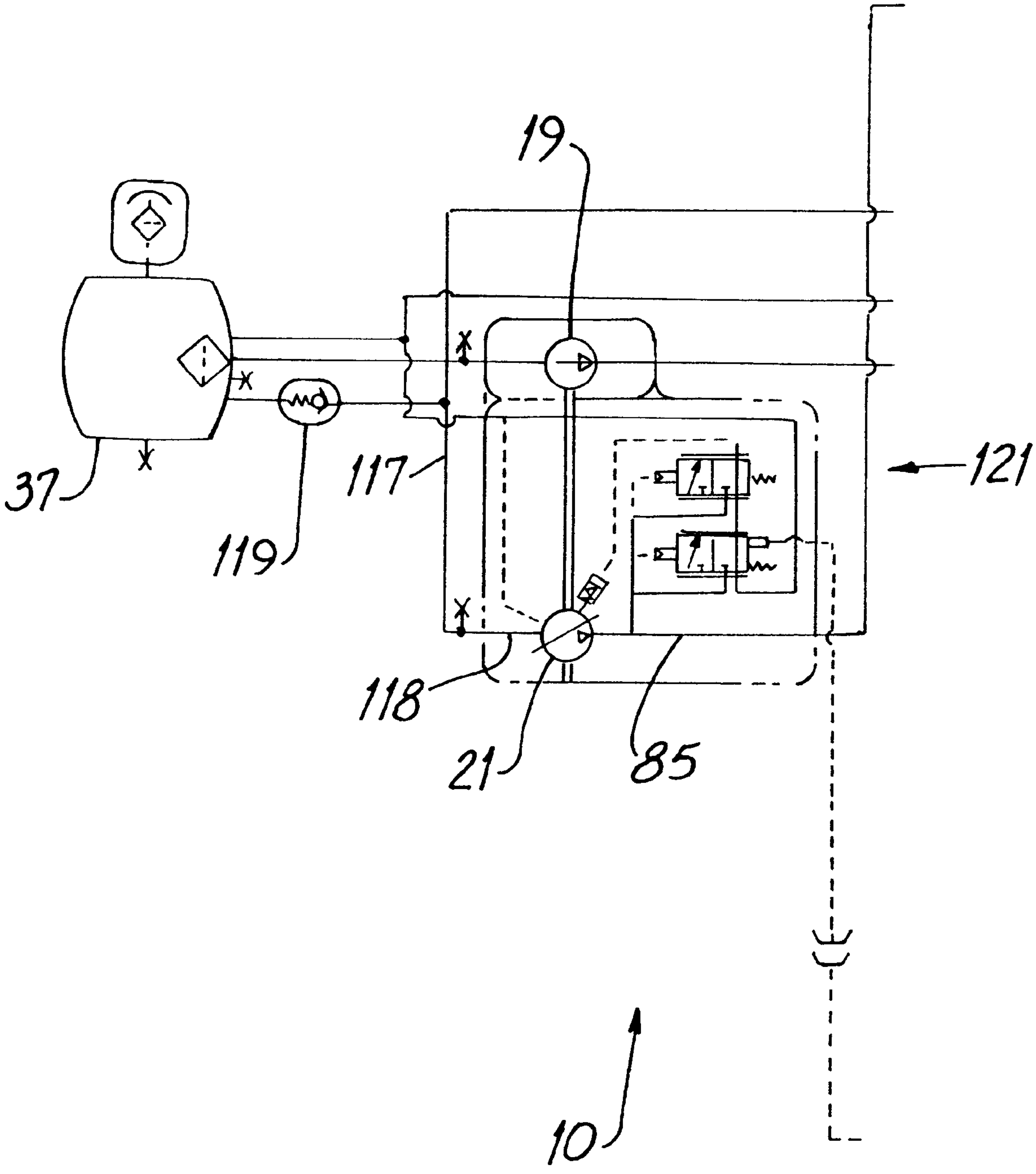
FIGS. 4A, 4B, 4C AND 4D, taken together, comprise a schematic diagram of the new hydraulic circuit.
Figure 4B:
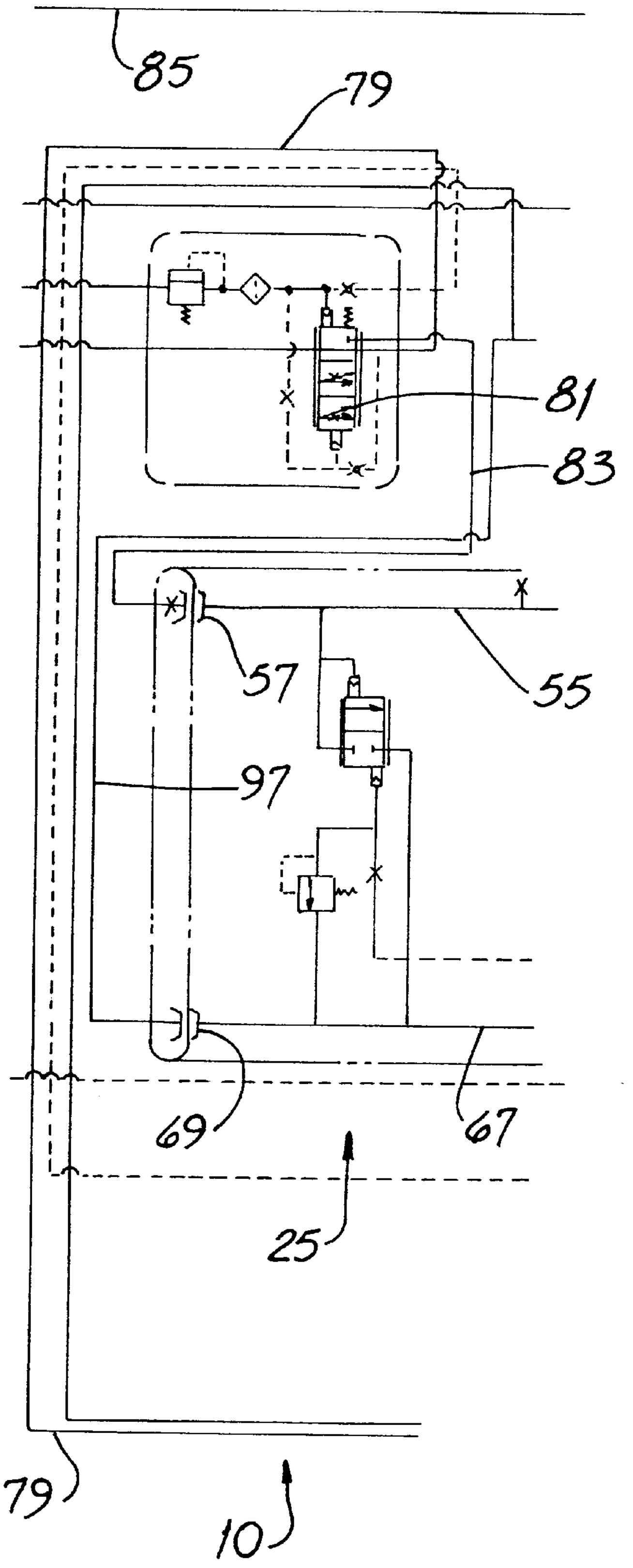
Figure 4C:
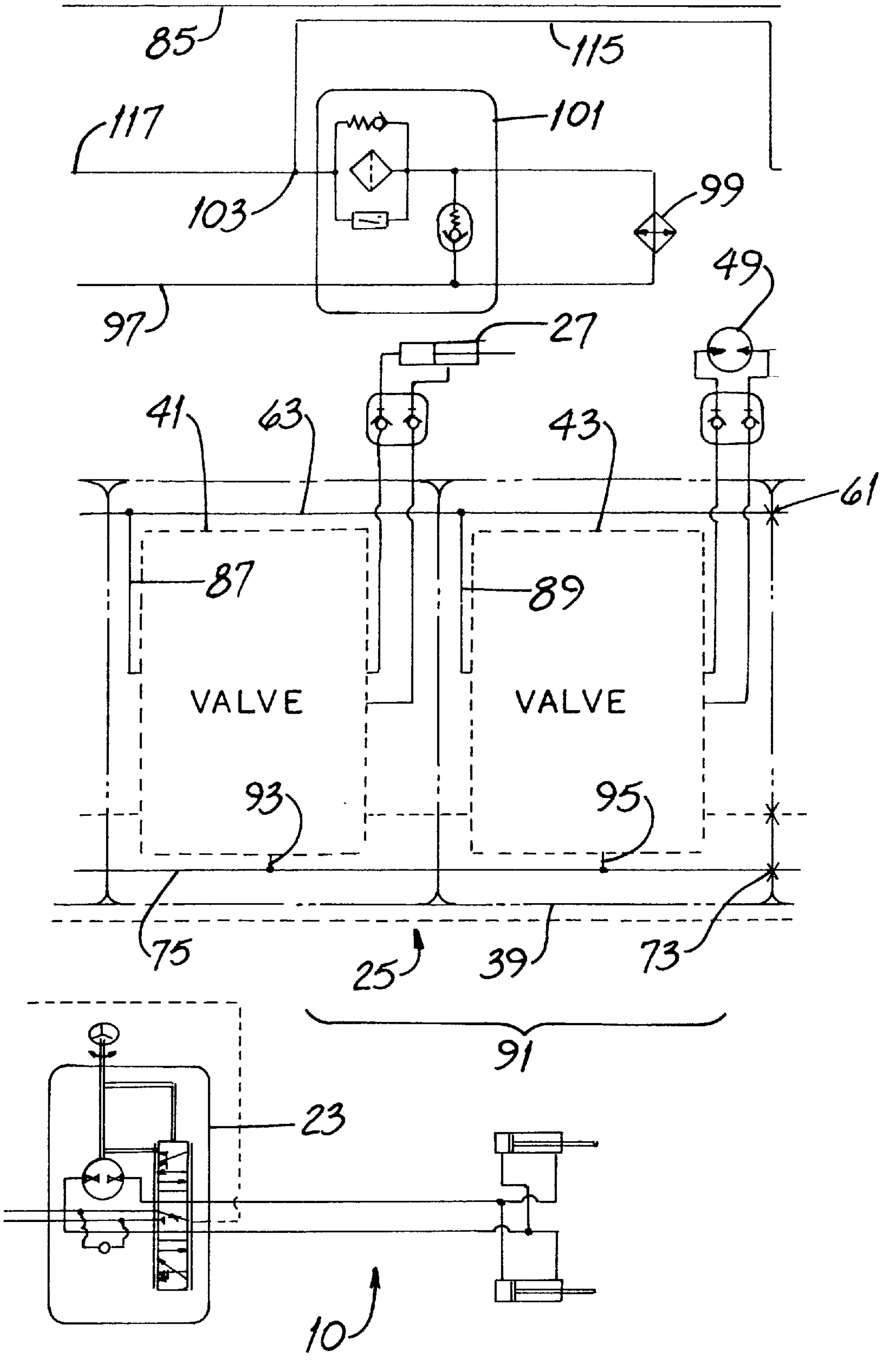
Figure 4D:
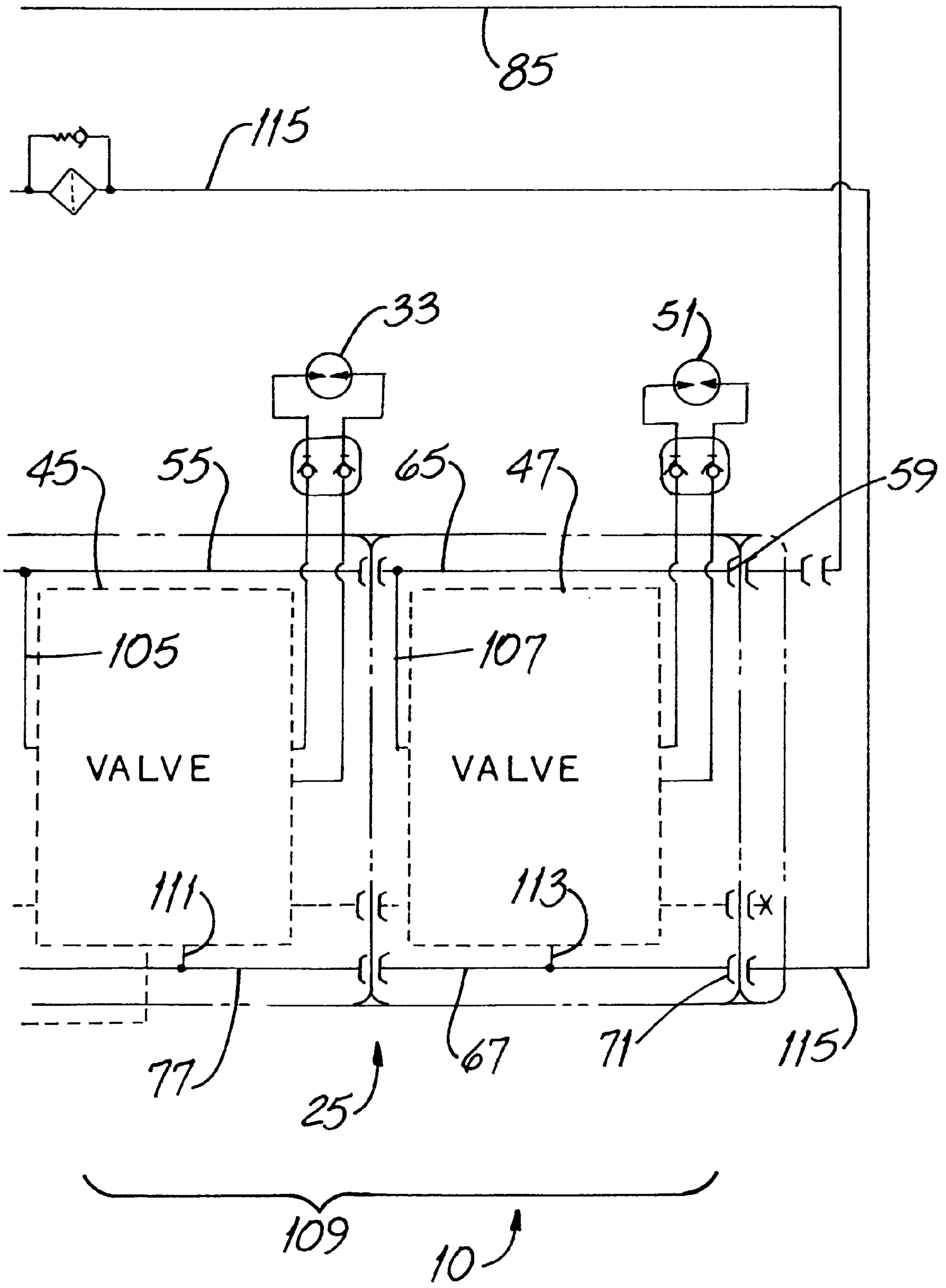

A priority valve 81 is coupled to the pump 19 and functions in a way that when the pressure in the line 79 is below a predetermined value 81, the valve is in the position shown in FIG 4B. All of the fluid delivered by the pump 19 flows through the line 79 to the power steering system 23. In other words, no fluid is then available for any other purpose.

On the other hand, if the fluid flow rate demanded by the power steering system 23 is modest, the valve 81 will modulate to maintain a nominal pressure in the line 79 and at the same time provide a large portion or substantially all of the fluid from the pump 19 to the line 83 which is connected to the first input port 57. The second pump 21 delivers all of its pumped fluid to the line 85 and thence to the second input port 59.

The feed lines 87 and 89 in the first valve section 91 are both connected to the first feed path 63 and such lines 87, 89 constitute the sources of pressurized fluid used by the valves 41, 43, respectively, to control the cylinder 27 and the motor 49, respectively. And the return lines 93 and 95 in the first section 91 are both connected to the first return path 75 and carry fluid at low pressure which has passed through the cylinder 27 or motor 49, respectively, and through the valves 41, 43, respectively. Fluid from the return path 75 flows along the line 97 through the cooler 99 and filter 101 to the junction 103 where, as further described below, it is joined by return fluid from the second pump 21.

Similarly, the feed lines 105 and 107 in the second valve section 109 are both connected to the second feed path 65 and such lines 105, 107, constitute the sources of pressurized fluid used by the valves 45, 47, respectively, to control the motors 33 and 51, respectively. And the return lines 111 and 113 in the second section 109 are both connected to the second return path 77 and carry fluid at low pressure which has passed through the motor 33 or 51, respectively, and through the valves 45, 47, respectively. Fluid from the return path 77 flows along the line 115 to the junction 103 where it joins the return fluid from the first pump 19.

The combined return fluid from the first and second pumps 19, 21 flows along the line 117 to the inlet 118 of the second pump 21. And since the combined return flow is greater than the output flow from the second pump 21 alone, the excess fluid returns to the reservoir 37 through a check valve 119. In a specific arrangement, the check valve opens at some modest pressure, e.g., 30 p.s.i., and thereby maintains a "supercharge" pressure at the inlet 118 to prevent the pump 21 from cavitating.

From the foregoing, it is now apparent that if the power steering system 23 is imposing heavy flow demands, there may not be enough fluid available at the first feed path 63 to power the cylinder 27 or the motor 49. Therefore, it is preferred that the work mechanisms connected to the first and second valves 41, 43 be of the type that are used only intermittently. The planter wing 29 and wing-positioning cylinder 27 shown in FIG. 3 comprise an example of a work mechanism 30 of that type.

And it is also apparent that the second pump 21 is dedicated to powering whatever mechanisms 35, or motor 51 are connected to the third and fourth valves 45, 47. Therefore, such mechanisms 35 or motor 51 either of them may be (but are not required to be) of the type which run continuously. The planting mechanism 31 and its motor 33 described above comprise a work mechanism 35 of the latter type.

(From the foregoing, it is apparent that it is not the configuration of the work mechanism 30 or 35, i.e., cylinder- or motor-powered, that is important in deciding to power a mechanism 30 or 35 from the first section 91 or the second section 109. Rather, it is the way in which such work mechanism operates, i.e., intermittently or continuously.)

Considering FIGS. 4A–4D, it is to be noted that the pressure ports of the pumps 19, 21, respectively, are isolated from one another by the closure 61. And in the manifold 39 and to the junction 103, the return lines 97, 115, of the pumps 19, 21, respectively, are isolated from one another by the closure 61. Such circuit isolation helps assure that the power steering system 23 and the valves 41, 43, in the first section 91 (on the one hand) and the valves 45, 47, in the second section 109 (on the other hand) do not interact with one another. Therefore, the controls, i.e., the priority valve 81 and the pump controls 121, are stable and perform as intended without being influenced by pressure transients or the like that might occur if circuit isolation were not used.

Figure 5:
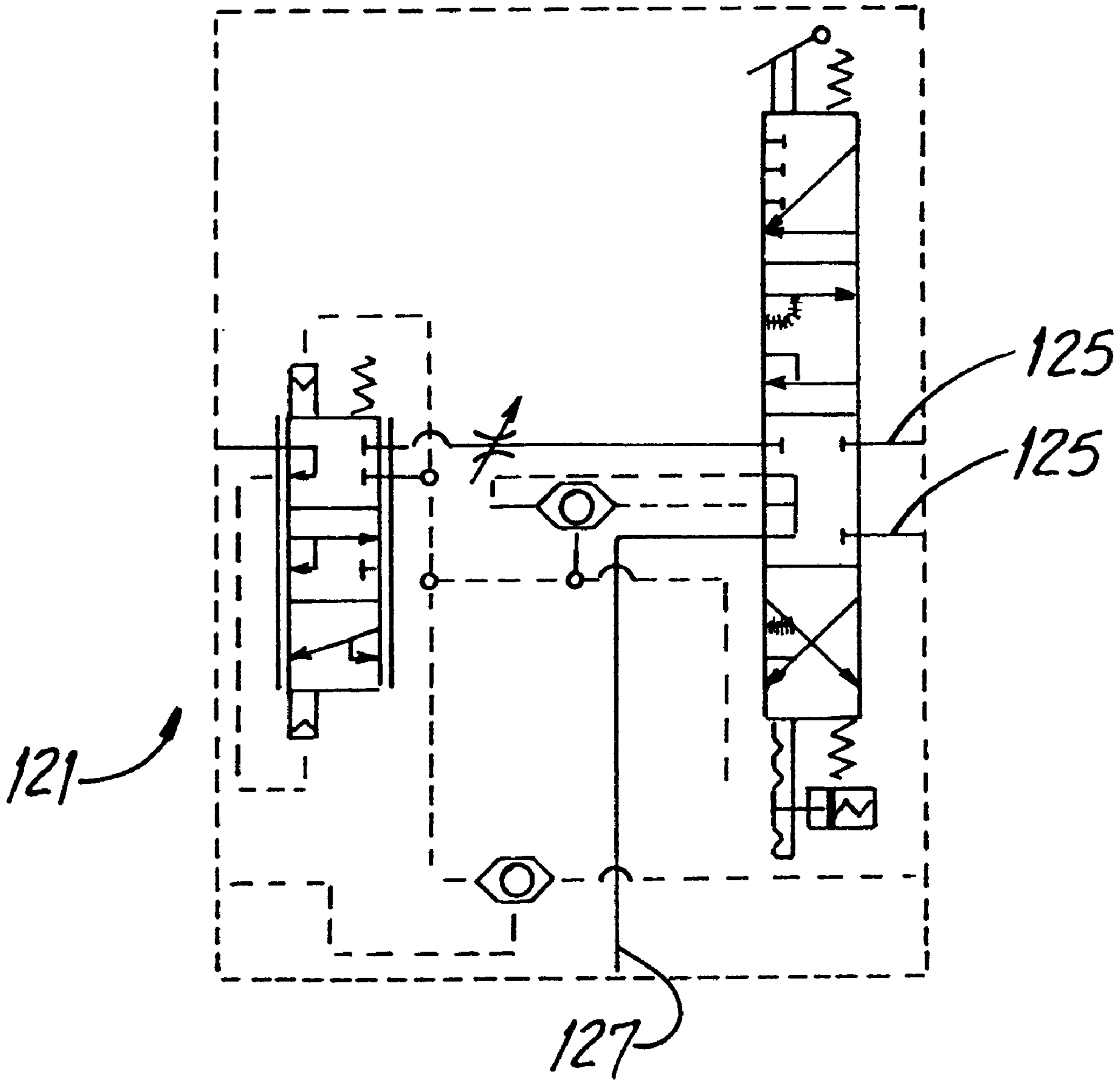
FIG. 5 is a schematic diagram of an exemplary directional control valve that can be used in the circuit.

FIG. 5 shows an exemplary directional control valve 123 that can be used as any one, some or all of the valves 41, 43, 45, 47. Merely as an example, if the valve 123 is used for valve 41, the lines 125 are used to power the cylinder 27 and the line 127 connects to the return line 93.

While the principles of the invention have been shown and described in connection with a few preferred embodiments, it is to be appreciated that such embodiments are by way of example and are not limiting.

What is claimed:

1. A hydraulic circuit for an agricultural tractor including:

a valve assembly having a manifold block with first and second valves fitted therein;

and wherein the manifold block further includes:

a first feed path connected to the first valve and a second feed path flow-isolated from the first feed path and connected to the second valve;

a first return path connected to the first valve and a second return path flow-isolated from the first return path and connected to the second valve;

and wherein the circuit further includes:

a first pump flowing fluid to the first feed path; and a second pump flowing fluid to the second feed path;

and wherein:

the first pump is a fixed displacement pump and the second pump is a variable displacement pump; and the second pump has an inlet and the first and second return paths are connected to the inlet through a common return line.

2. The circuit of claim 1 including a power steering system and wherein:

the first pump is connected to the power steering system through a priority valve; and the first pump flows fluid to the power steering system and to the first feed path.

3. The circuit of claim 2 in combination with the tractor and a planter towed by the tractor and having a planting mechanism powered by a rotary hydraulic motor and at least one lateral wing extension powered by a hydraulic cylinder, and wherein:

the valve assembly is mounted on the tractor;

the first valve is connected to the hydraulic cylinder and the second valve is connected to the motor.

4. The circuit of claim 1 in combination with the tractor and a planter towed by the tractor and having a planting mechanism powered by a rotary hydraulic motor and at least one lateral wing extension powered by a hydraulic cylinder, and wherein:

the first valve is connected to the hydraulic cylinder and the second valve is connected to the motor.

5. The circuit of claim 1 wherein the second feed path is continuously flow-isolated from the first feed path.

6. The circuit of claim 1 wherein the second return path is continuously flow-isolated from the first return path.

7. In combination, (a) a tractor, (b) a planter towed by the tractor and including a planting mechanism powered by a rotary hydraulic motor and at least one lateral wing extension powered by a hydraulic cylinder, and (c) a hydraulic circuit for the tractor, and wherein the circuit includes:

a valve assembly having a manifold block with first and second valves fitted therein;

and wherein the manifold block further includes:

a first feed path connected to the first valve and a second feed path flow-isolated from the first feed path and connected to the second valve;

a first return path connected to the first valve and a second return path flow-isolated from the first return path and connected to the second valve;

and wherein the circuit further includes:

a fixed displacement pump flowing fluid to the first feed path; and a variable displacement pump flowing fluid to the second feed path;

and wherein:

the first valve is connected to the hydraulic cylinder and the second valve is connected to the motor.

8. In combination, (a) a tractor, (b) a planter towed by the tractor and including a planting mechanism powered by a rotary hydraulic motor and at least one lateral wing extension powered by a hydraulic cylinder, and (c) a hydraulic circuit for the tractor, and wherein the circuit includes a power steering system and further includes:

a valve assembly mounted on the tractor and having a manifold block with first and second valves fitted therein;

and wherein the manifold block further includes:

a first feed path connected to the first valve and a second feed path flow-isolated from the first feed path and connected to the second valve;

a first return path connected to the first valve and a second return path flow-isolated from the first return path and connected to the second valve;

and wherein the circuit further includes:

a fixed displacement pump flowing fluid to the first feed path; and a variable displacement pump flowing fluid to the second feed path;

and wherein:

the first pump is connected to the power steering system through a priority valve;

the first pump flows fluid to the power steering system and to the first feed path;

the first valve is connected to the hydraulic cylinder and the second valve is connected to the motor.

* * * * *

UNITED STATES PATENT AND TRADEMARK OFFICE

CERTIFICATE OF CORRECTION

PATENT NO. : 5,918,558

DATED : 07/06/1999

INVENTOR(S) : David E. Susag

It is certified that error appears in the above-identified patent and that said Letters Patent is hereby corrected as shown below:

Column 4, line 3, after "system" cancel "21" and insert ---23---

Signed and Sealed this

First Day of February, 2000

*Attest:*

Q. TODD DICKINSON

*Attesting Officer*

*Acting Commissioner of Patents and Trademarks*